Jan. 15, 1952     D. L. CARLSON     2,582,478
TWO-WAY PLOW
Filed May 18, 1949     3 Sheets-Sheet 1

INVENTOR.
DONALD L. CARLSON
BY
ATTORNEYS

Jan. 15, 1952 — D. L. CARLSON — 2,582,478
TWO-WAY PLOW
Filed May 18, 1949 — 3 Sheets-Sheet 2

INVENTOR.
DONALD L. CARLSON
BY
ATTORNEYS

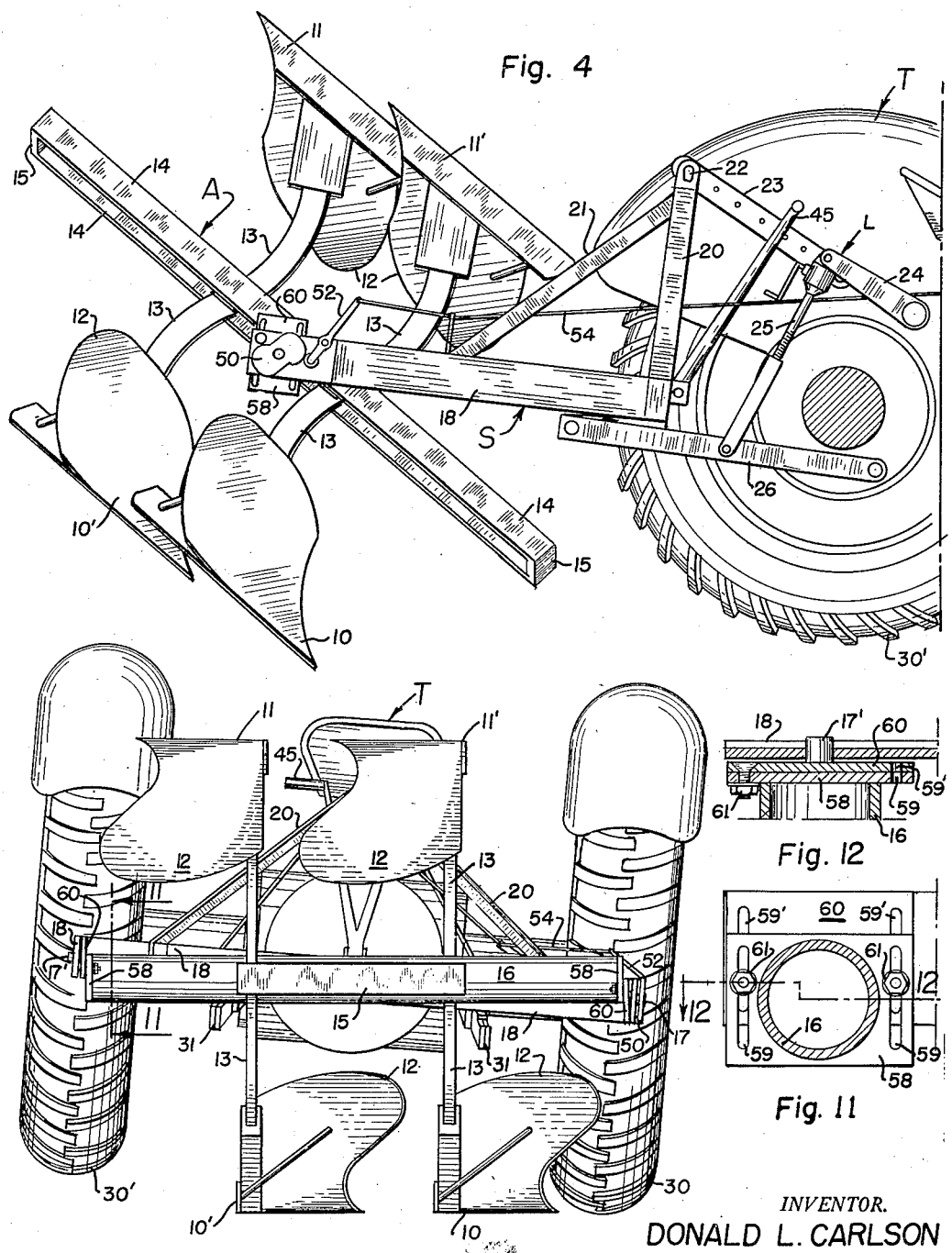

Patented Jan. 15, 1952

2,582,478

UNITED STATES PATENT OFFICE 2,582,478

TWO-WAY PLOW

Donald L. Carlson, Denver, Colo.

Application May 18, 1949, Serial No. 93,861

12 Claims. (Cl. 97—26)

This invention relates to two-way plows, which are normally used in plowing a furrow across a field in one direction, as by pulling with a tractor or the like, and then plowing the next furrow on the return trip but turning the earth in the same direction.

Two-way plows are normally provided with right hand and left hand plow bottoms, which are adapted to be used alternatively, when traveling in opposite directions. In one type, a single right hand and a single left hand plow are mounted on opposite sides of a longitudinally extending axle which is rotated to shift from right to left hand, and vice versa. In this type, only a single plow for each direction can be utilized, and the axle may be mounted on separate wheels or on the rear end of a tractor. In another type, a right hand plow and a left hand plow are mounted in tandem on the rear of a tractor, one plow being down and the other up, when plowing in one direction, and vice versa in the opposite direction. However, the amount of plowing that can be done is limited by the single plow in each direction. In still another type, one or two plows for each direction are mounted on opposite sides of a transversely extending axle, in turn mounted on a wheeled carriage, which may be pulled by a tractor. The plows are changed by rotation from front to back, but the depth of plowing is limited by the tractive effort of the tractor, and the length of the carriage interferes with short turns and access to corners and the like. Also, the carriage limits the speed of movement in taking the plow from one field to another, or along a road or highway.

Among the objects of this invention are to provide a novel two-way plow; to provide a two-way plow which may be mounted on the rear of a tractor or the like and include more than one plow bottom for each direction without requiring auxiliary supporting wheels; to provide a two-way plow which, when mounted on the rear of a tractor or the like, will tend to increase the effective tractive effort; to provide a two-way plow including a support which may be closely coupled to a tractor; to provide a two-way plow for which a minimum of lever shifting or similar operations is necessary to change the plow positions when the end of a furrow is reached and the next furrow is to be made in the opposite direction; to provide a two-way plow wherein each plow may be maintained level, irrespective of whether one rear wheel of a tractor may be traveling in a furrow and the other rear wheel traveling on unplowed ground; to provide a two-way plow in which a minimum of adjustment is necessary; and to provide a two-way plow construction which is relatively easy to build, but will withstand the rigors of hard usage and abuse.

Additional objects and the novel features of this invention will become apparent from the description which follows, taken in connection with the accompanying drawings, in which:

Fig. 3 is a rear elevation of the plow and tractor of Fig. 1;

Fig. 4 is a side elevation similar to Fig. 1, but illustrating another position of the plow when changing from right to left hand, or vice versa;

Fig. 8 is an enlarged fragmentary view of a cam and associated parts which produce automatic lifting of the plow support when the plows are reversed in position;

Fig. 9 is an enlarged fragmentary view taken at the lift control lever of the tractor;

Fig. 10 is an oblique section taken along line 10—10 of Fig. 9;

Fig. 11 is a vertical section taken along line 11—11 of Fig. 3; and

Fig. 12 is a cross section taken along line 12—12 of Fig. 11.

As illustrated in Figs. 1 to 4, a two-way plow constructed in accordance with this invention may include generally a plow assembly A mounted on the rear of a support S, which in turn is mounted on the rear of a tractor T and is adapted to be raised and lowered by lifting mechanism L, normally provided on the tractor T. The plow assembly A includes a pair of right hand plows 10 and 10', and a pair of left hand plows 11 and 11', which are disposed on opposite sides of a common axis transverse to the support S, the change from the right hand to the left hand plows being made by rotation of the plow assembly A about the axis. As will be described in greater detail hereinafter, the two-way plow of this invention includes, among other features, means for automatically lifting the support S and plow assembly A whenever the plows are turned over; an off-center connection at each end of the common axis of the plows to insure that each will plow to the same depth when one rear wheel of the tractor is riding in a furrow and the other on unplowed ground; and a special connection between the support S and the tractor T, which lessens the total length of the tractor and plow assembly.

Figure 1:
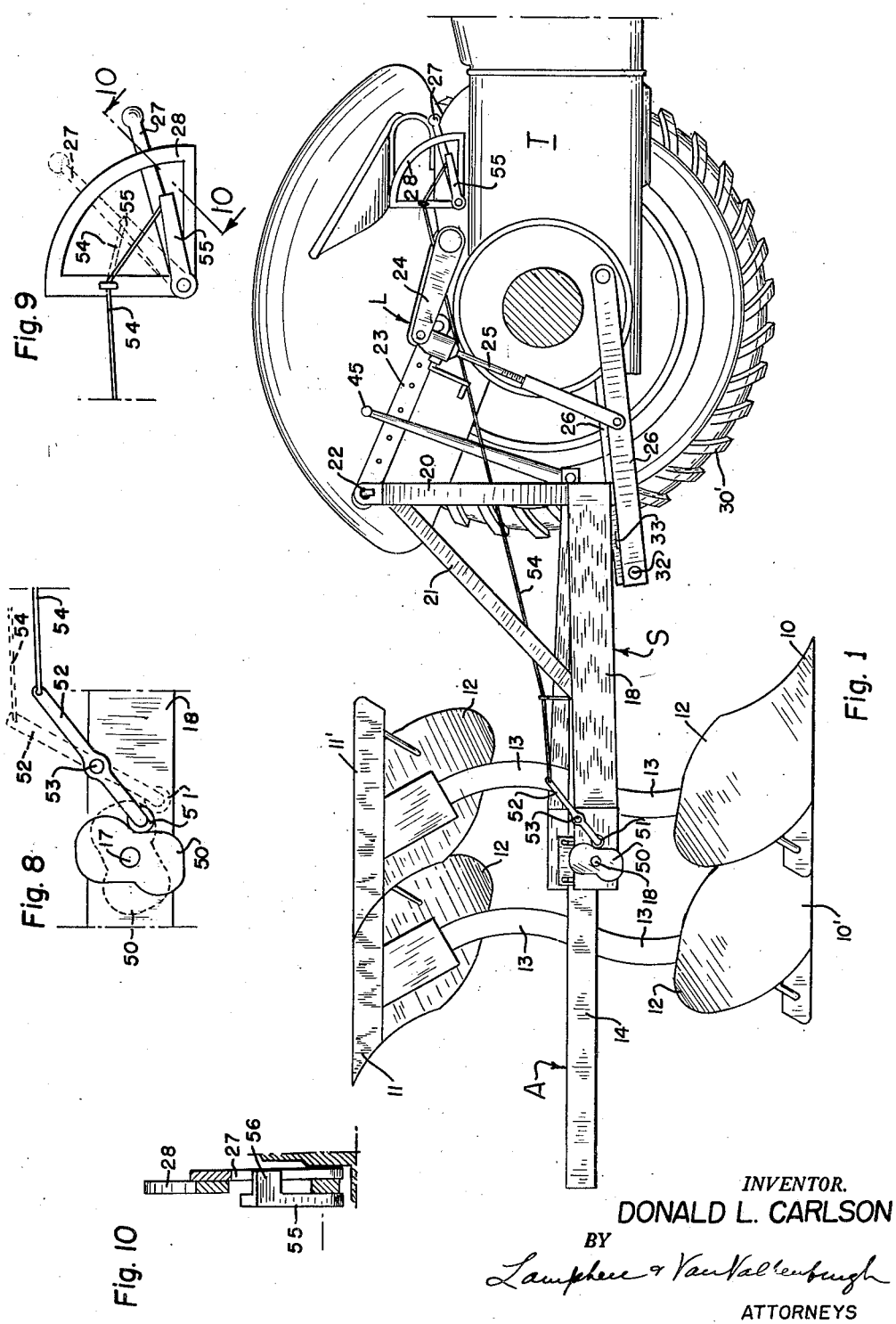
Fig. 1 is a side elevation of a two-way plow constructed in accordance with this invention and mounted on the rear of a tractor, certain tractor parts being omitted for clarity of illustration.
Figure 2:
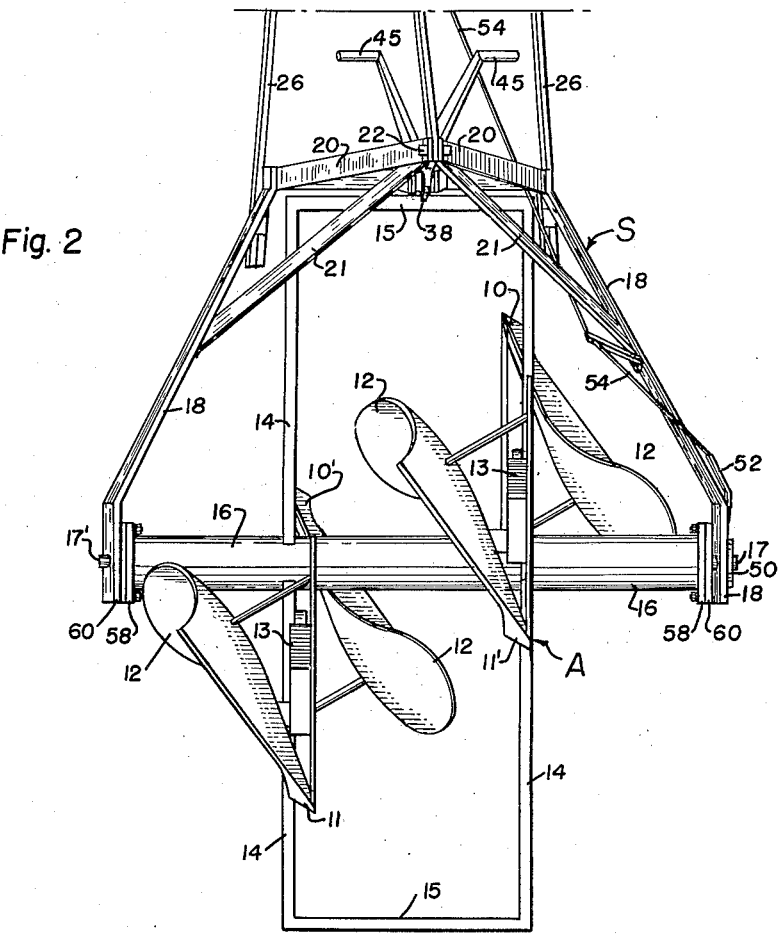
Fig. 2 is a top plan view of the two-way plow of Fig. 1.

Each of the plows may include a moldboard 12, the difference between the right and left hand plows being that, when the right hand plows 10 and 10' are pulled by the tractor, as in Fig. 1, the earth will be turned over to the right, while when the positions of the plows are reversed, the left hand plows 11 and 11' will turn the earth over to the left. Since it is desirable to turn the furrows over in the same direction, the right hand plows are utilized in traveling across the field one way and the left hand plows on the return trip. While two right hand and two left hand plows are shown, it will be understood that, if desired, only one left hand and one right hand plow may be used, or any other desired number. The tractor T, as shown, is provided with a lifting mechanism L of the so-called "Ford-Ferguson" type, but it will be understood that the two-way plow of this invention may be installed on other types of tractors and in conjunction with other types of lifting mechanism.

Figure 5:
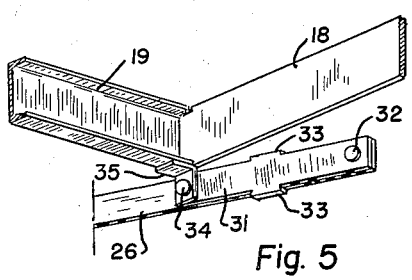
Fig. 5 is a fragmentary perspective view, on an enlarged scale, of certain parts at the point of attachment of the plow support to the tractor.

Each plow may be mounted on a beam 13, the upper end of which is attached to a side bar 14 of a rectangular framework which also includes end bars 15, the framework being mounted on a shaft 16. The shaft 16 may be solid, tubular or have any other cross-sectional shape, and is pivotally mounted, by means of pins 17 and 17', at the rear end of side bars 18 of support S, as in Figs. 2 and 3. The support S, in addition to side bars 18 which extend obliquely forwardly and inwardly, may also include a front bar 19 (shown in Fig. 5), front brackets 20, and angular braces 21. The upper ends of brackets 20 may be pivotally connected, as by pin 22 of Figs. 1 and 2, to a ram bar 23 of lifting mechanism L. The lifting mechanism L also includes a pair of lifting arms 24, connected by adjustable links 25 with lower supporting arms 26, one on each side of the tractor. The ram bar 23 and lifting arms 24 are moved simultaneously upwardly and downwardly by a hydraulic ram mechanism (not shown) conventionally provided on the tractor T. The hydraulic mechanism may be controlled by a handle 27 movable along a quadrant 28, as in Figs. 1 and 9, the position of the handle controlling the flow of hydraulic fluid to elevate the lifting mechanism L.

The front end of each supporting arm 26 is normally pivoted on the tractor, as shown, and the rear end normally extends to a position slightly rearwardly of the tires on the rear wheels 30 and 30' of the tractor. In order to insure that the plow will be disposed as closely as possible to the tractor, thereby giving not only additional traction to the rear wheels by virtue of the weight of the plows in the earth being turned, but also a close coupling to permit maneuvering into corners, and in small plots and fields, particularly as encountered in irrigated regions, in accordance with this invention, the forward end of the support S is pivotally mounted at a point forwardly of the rear ends of the supporting arms 26. For this purpose, a hitching bar 31, illustrated more clearly in Fig. 5, may be attached by a pin 32 to the rear end of the supporting arm 26, and prevented from movement with respect thereto by a pair of integral clips 33 which extend across the top and bottom, respectively, of supporting arm 26. The front end of each hitching bar 31 carries a pin 34 for pivotally mounting the front end of the support S, as by an angle 35 attached to the front bar 19 and/or side bar 18 of the support.

Figure 6:
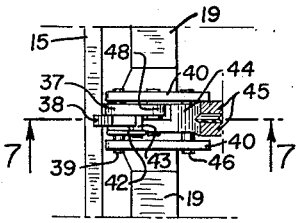
Fig. 6 is a fragmentary top plan view, on an enlarged scale, illustrating a latch mechanism.
Figure 7:
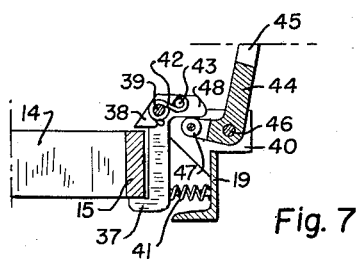
Fig. 7 is a vertical section taken along line 7—7 of Fig. 6.

The front bar 19 of support S may carry a latching mechanism, illustrated more particularly in Figs. 6 and 7, which is adapted to maintain the plows in position until released whereupon rotation of the plow assembly may take place. Such latching mechanism may include a lower latch 37 and an upper latch 38, both of which may be pivotally mounted on a pin 39, which extends transversely between brackets 40, in turn mounted on front bar 19 of support S. A compression spring 41, the ends of which may be held in position by suitable projections, as shown, bears between the lower latch 37 and the front bar 19, while a torsion spring 42 maintains upper latch 38 normally against a stop pin 43, conveniently mounted on latch 37. The latching mechanism maintains the end bar 15 of the plow assembly A in position, i. e. prevents the plow assembly from rotating. A lever 44, provided with dual handles 45 for convenience in tripping the latch mechanism by either hand of the operator, is pivoted at its lower end on a pin 46 and provided with a roller 47 adapted to engage a right angle extension 48 of the lower latch 37. When either handle 45 of lever 44 is pulled forwardly, the end of the lower latch 37 will compress spring 41, thus permitting the end bar 15 to move downwardly and the plow assembly to rotate over to the opposite position. As the opposite end bar 15 comes around, it will snap past upper latch 38 into locked position between the latches, and will stay in this position until the lower latch is again released.

The latch mechanism is operated when the end of a furrow is reached, or for any other reason the operator wishes to turn the plows over, the release of lower latch 37 permitting the plow assembly A to turn by virtue of the fact that the lower plows are in the ground, and as the tractor pulls the assembly forward, the resistance of the plows to movement causes the plow assembly A to turn in a clockwise direction, when viewed from the right side, as in Fig. 4. As the lower plows leave the ground, the forward end bar 15 will engage the ground, and cause the plow assembly to continue turning until the plows which were uppermost will have reached the lowermost position. At this time, the opposite end bar 15 will engage the latch mechanism and hold the plow assembly in a position ready for plowing in the opposite direction.

At the same time, and in further accordance with this invention, a cam 50 which is mounted on pin 17 will have engaged a roller 51, mounted on the lower end of a link 52, which is in turn pivoted on a pin 53 on the adjacent side bar 18. As in Figs. 1, 8 and 9, when the link 52 is moved from the full to the dotted position of Fig. 8, by movement of cam 50 to the dotted position, a cable 54, which is attached at its rear end to the upper end of link 52, will pull an actuating lever 55 upwardly. Lever 55 may be provided with an ear 56, as in Fig. 10, to move the lift control handle 27 upwardly along quadrant 28, as to the dotted position of Fig. 9, so that the lifting mechanism L will lift the support S and the plow assembly A.

The shape of cam 50 is preferably irregular, since as soon as the plows begin to move out of the ground, the support S will be lifted slightly, so that an additional rise on the cam 50 is desirable to compensate therefor. The two-way plow thus will be lifted at the rear of the tractor, in a position in which the tractor may be turned for the next furrow, may be backed around into a corner or the like, or may be moved to another field. It will be evident that the only operation required to cause the plows to turn automatically to the opposite position, and also to lift the plow assembly to an upper, transporting position, is merely to pull one of the dual handles 45 of lever 44 forwardly, to release the latch holding the plow assembly A. When the plow assembly A has turned over, the rise in cam 50 will have passed the roller 51, so that cable 54 will be slack. Thus, when the operator is ready to lower the plows for the next trip, as after turning the tractor around, it is necessary only to move the lever 27 down to the full position of Figs. 1 and 9, actuating lever 55 being pulled down with it. Ear 56 permits the operator to move lever 27 to lift the support S independently of the automatic actuation thereof.

In further accordance with this invention, and as shown more particularly in Figs. 3, 11 and 12, the two right hand plows 10 and 10', as well as the two left hand plows 11 and 11' are adapted to plow even bottomed furrows, despite the possibility of one rear wheel 30 of the tractor being in a furrow, while the other rear wheel 30' is higher by virtue of its being on unplowed ground, or vice versa. For this purpose, the shaft 16 may be provided at each end with a flange 58 which, in turn, is provided with slots 59. A plate 60, which may be similar in shape to flange 58 and provided with similar vertical slots 59', carrying on its opposite side the pin 17 or 17', is adapted to be adjusted upwardly and downwardly along flange 58, as by bolts 61, or any other suitable adjusting mechanism. The relative position of each flange 58 with respect to the adjacent plate 60 may be adjusted so that at one end of the shaft, the pin 17 will be offset from the center line of shaft 16 by a predetermined amount, and at the opposite end of the shaft 60, the pin 17' will be offset an equal distance, but in an opposite direction from the center line of shaft 16. The distance which each pin 17 or 17' is offset from the center of the shaft 16 is preferably equal to one-half of the variation in height between the wheels. As will be evident from Fig. 3, with the right hand plows 10 and 10' down, as shown, the pin 17 is disposed below the center line of shaft 16, while the pin 17' is above the center line of the shaft. However, when the plow assembly A is rotated, to place the left hand plows 11 and 11' in down position, the pin 17 will then be above the center line of the shaft, while the pin 17' will be below, but when the tractor is proceeding in the opposite direction, with the left hand plows 11 and 11' down, the opposite wheel 30' will be in the furrow and the wheel 30 which was previously in the furrow, will be on unplowed ground. Thus, the plow bottoms are automatically maintained level, so that both plows will extend into the ground a substantially equal depth, and when the plow assembly is turned, the opposite plows are automatically placed in position to plow furrows of the same depth.

From the foregoing, it will be evident that the two-way plow of this invention fulfills to a marked degree the requirements and objects hereinbefore set forth. As will be evident, the provision of means for automatically effecting lifting of the plow support, whenever the plows are turned, not only simplifies the control operations necessary for the operator, but also insures that the plows will be in the desired position when the next furrow is begun. Since the lifting mechanism control handle will stay in any predetermined position, the plow assembly will remain up until the operator is ready to start the next furrow, at which time it is necessary only to move the control handle down to the lowering position, and the next furrow may immediately be started. The preferred mechanism for automatically accomplishing this is relatively simple in construction and is easily installed, in conjunction with conventional tractor lifting mechanism control devices.

The hitch by which the plow support is pivotally attached to the lifting arms inwardly of the rear end thereof brings the plows closer to the tractor, adds weight to the rear wheels and therefore increases traction, and at the same time reduces the overall length of the tractor and plow, so that it is easier to get into small corners, and furrows can be started closer to the boundary line of the field. Less power is required to do an equivalent amount of plowing, as compared with a wheel type plow which introduces additional traction caused by wheels and the added weight of a longer plow. Also, the plow of this invention is carried on the tractor, and may be transported from field to field, or along highways at higher speeds than a wheel type plow.

The provision of the adjustable off-center connections between the plow assembly shaft and the support side arms is also of considerable advantage, since it is necessary to adjust them only once to the depth to which the furrow is being plowed, after which they will automatically take care of the turning of the plows and permit two furrows to be plowed simultaneously to the same depth.

Although a preferred embodiment of this invention has been illustrated and described with particularity, it will be understood that various changes may be made therein and that other embodiments may exist, all without departing from the spirit and scope of this invention.

What is claimed is:

1. A two-way plow construction for a tractor or the like having a lifting mechanism, comprising left and right hand plows mounted on opposite sides of a common axis; a support for said plows and adapted to be mounted on said lifting mechanism; releasable means for maintaining each plow in down position; and means controlled by movement of said plows about said axis for actuating said lifting mechanism to lift said support upon release of said maintaining means and movement of said plows about said axis.

2. A two-way plow construction, comprising left and right hand plows mounted on opposite sides of a common axis; a liftable support for said plows; means for lifting said support; a shaft extending transversely of said support and forming the axis for said plows; releasable means for maintaining each plow in down position; a cam mounted on said shaft; and means actuated by said cam for initiating movement of said support by said lifting means upon release of said maintaining means and movement of said plows about said axis.

3. A two-way plow construction for a tractor or the like having an hydraulic lifting mechanism and a control handle therefor, comprising left and right hand plows mounted on opposite sides of a common axis; a support for said plows mountable on said lifting mechanism; a shaft extending transversely of said support and forming the axis for said plows; releasable means for maintaining each plow in down position; and means actuated by said shaft and operatively connected with said lifting mechanism handle for initiating movement of said support by said lifting mechanism upon release of said maintaining means and movement of said plows about said axis.

4. A two-way plow construction for a tractor having a lifting mechanism, comprising left and right hand plows mounted on opposite sides of a common axis transverse to the direction of movement of said plows; a wheel-less support for said plows mountable on said lifting mechanism; releasable means for maintaining each plow in down position; and means controlled by movement of said plows about said axis, for actuating said lifting mechanism and thereby effecting the lifting of said support upon release of said maintaining means and movement of said plows about said axis.

5. A two-way plow construction for a tractor having rear wheels and a pair of spaced lift arms extending rearwardly between said wheels, said lift arms having normal points of attachment at the rear ends thereof, said construction comprising left and right hand plows mounted on opposite sides of a common axis extending transversely to the direction of movement of said plows and tractor; a support for said plows including a framework, the front end of which has a lesser width than the distance between said wheels; and a bracket mounted on each said lift arm and attached to the normal point of attachment at the rear end thereof, each bracket extending forwardly along a lift arm and having a pivotal connection for the front end of said support framework forwardly of the rear end of said lift arm.

6. A two-way plow construction as defined in claim 5, wherein each said bracket carries a pin at the forward end for attachment of said support, and is provided with ears extending across the top and bottom of said lift arm.

7. A two-way plow construction for use on a tractor or the like and as defined in claim 5, including a shaft extending transversely of said support; and an off-center connection between said shaft and said support at each end of said shaft, whereby said plows may be maintained in generally horizontal position with one rear wheel of the tractor in the furrow and the other rear wheel on unplowed ground.

8. A two-way plow construction for use on a tractor or the like, comprising a support liftably mountable on the rear of said tractor; a shaft extending transversely of said support; at least two left and at least two right hand plows mounted on opposite sides of said shaft; and an off-center connection between said shaft and said support at each end of said shaft, whereby said plows may be maintained in generally horizontal position with one rear wheel of the tractor in the furrow and the other rear wheel on unplowed ground.

9. A two-way plow construction for a tractor having lifting arms extending rearwardly, comprising a framework and a shaft extending transversely thereof; left and right hand plows mounted on opposite sides of said shaft; a liftable support including side arms and a releasable latch mechanism for said framework, said framework being pivotally mounted on said support; and a bracket between each side arm of said support and each lifting arm for attaching said side arms to said tractor forwardly of the rear end of said lifting arms.

10. A two-way plow construction for a tractor having a lifting mechanism, comprising a support mountable on said lifting mechanism; a framework including a shaft extending transversely thereof and forming an axis; left and right hand plows mounted on opposite sides of said framework; a latch mechanism on said support for releasably maintaining said plows in down position; a cam turnable with said shaft; and means actuated by said cam for initiating movement of said support by said lifting means upon release of said latch mechanism and movement of said plows about said axis.

11. A two-way plow construction for a tractor or the like having a lifting mechanism and a control handle therefor, comprising left and right hand plows mounted on opposite sides of a common axis; a support for said plows and mountable on said lifting mechanism; a shaft extending transversely of said support and forming the axis for said plows; releasable means for maintaining each plow in down position; a cam mounted on said shaft; a lever operatively connected with said lifting mechanism control handle; a cable connected at one end to said lever; a link on said support and connected to the opposite end of said cable; and a cam follower on said support link and engageable by said cam to initiate movement of said support by said lifting mechanism upon release of said maintaining means and movement of said plows about said axis.

12. A two-way plow construction for use on a tractor or the like, comprising a support liftably mountable on the rear of said tractor; a shaft extending transversely of said support; at least two left and at least two right hand plows mounted on opposite sides of said shaft; a flange at each end of said shaft and having slots therein; a plate having corresponding slots and provided with a pin journaled on said support; and adjustable means cooperating with said slots to maintain said pins in off-center positions with respect to said shafts and thereby providing an off-center connection between said shaft and said support at each end of said shaft, whereby said plows may be maintained in generally horizontal position with one rear wheel of the tractor in the furrow and the other rear wheel on unplowed ground.

DONALD L. CARLSON.

REFERENCES CITED

The following references are of record in the file of this patent:

UNITED STATES PATENTS

| Number | Name | Date |
|---|---|---|
| 1,358,158 | Karn | Nov. 9, 1920 |
| 1,971,180 | Graham | Aug. 21, 1934 |

FOREIGN PATENTS

| Number | Country | Date |
|---|---|---|
| 259,848 | Italy | Aug. 24, 1928 |